Feb. 7, 1956 — C. W. MUSSER — 2,733,639
BREECH MECHANISM FOR HEAVY CALIBER RECOILLESS GUN
Filed July 1, 1948 — 6 Sheets-Sheet 1
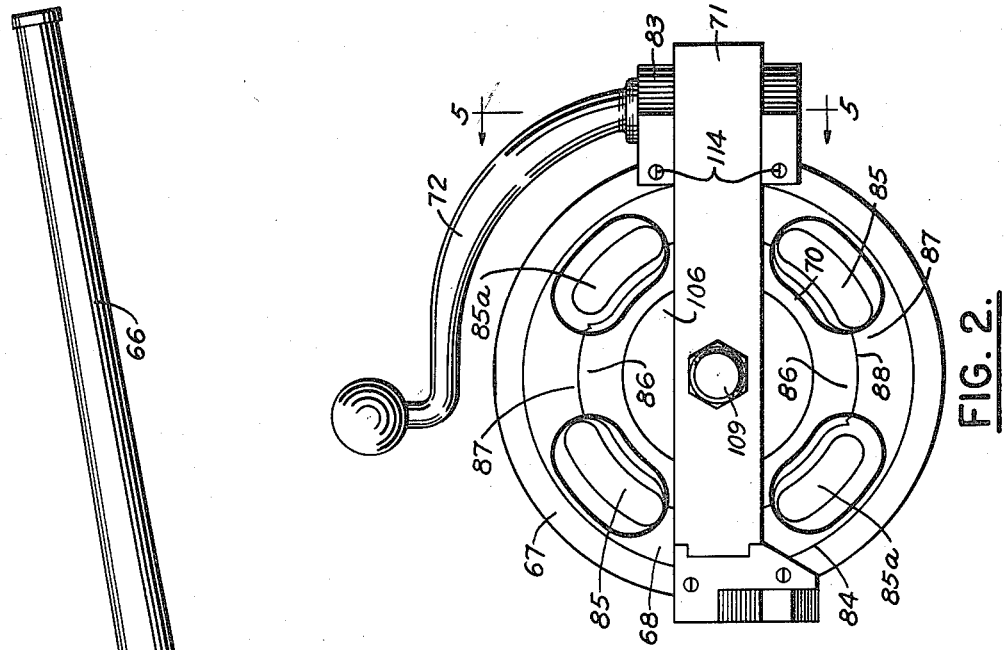
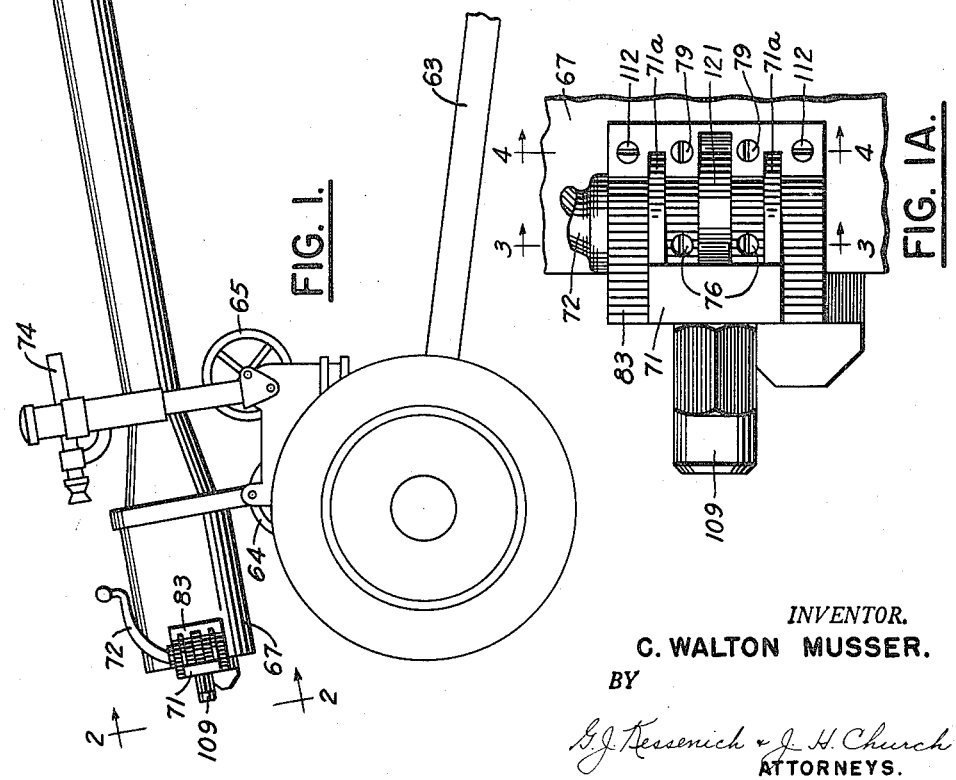
INVENTOR.
C. WALTON MUSSER.
BY
G. J. Kessenich & J. H. Church
ATTORNEYS.

Feb. 7, 1956 C. W. MUSSER 2,733,639
BREECH MECHANISM FOR HEAVY CALIBER RECOILLESS GUN
Filed July 1, 1948 6 Sheets-Sheet 2
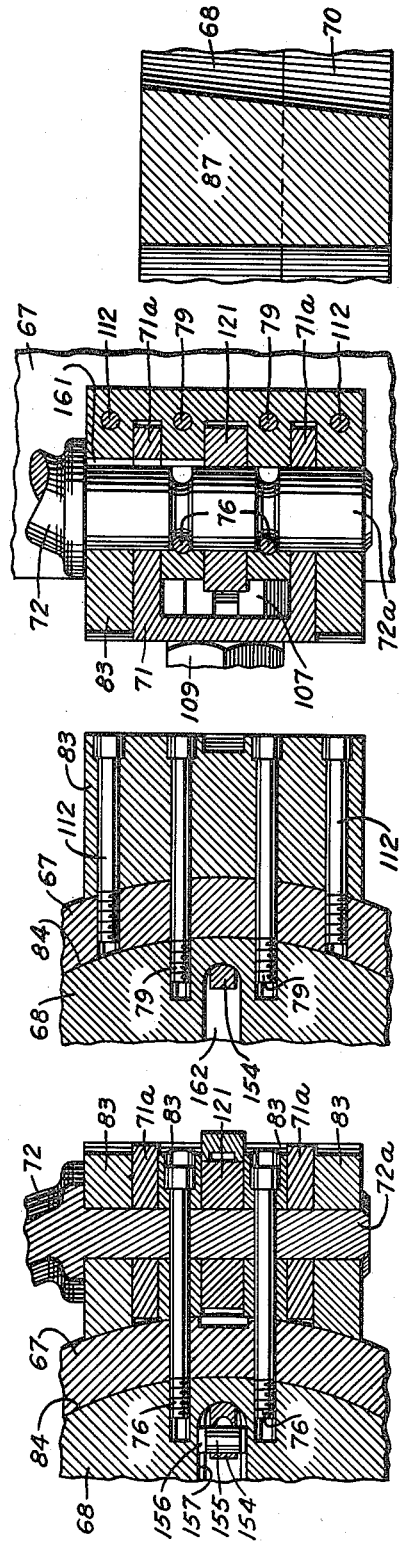
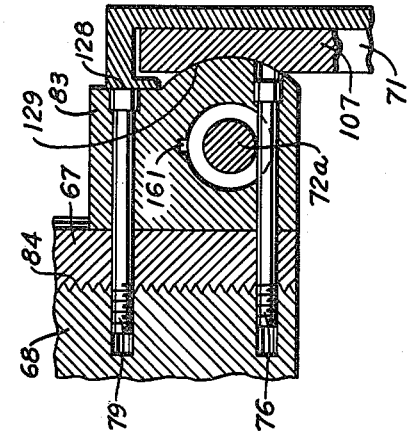
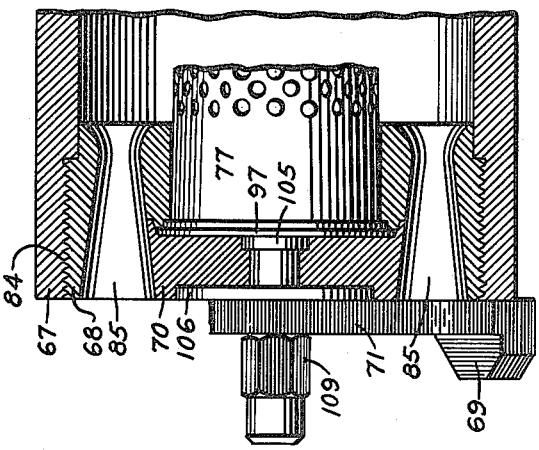
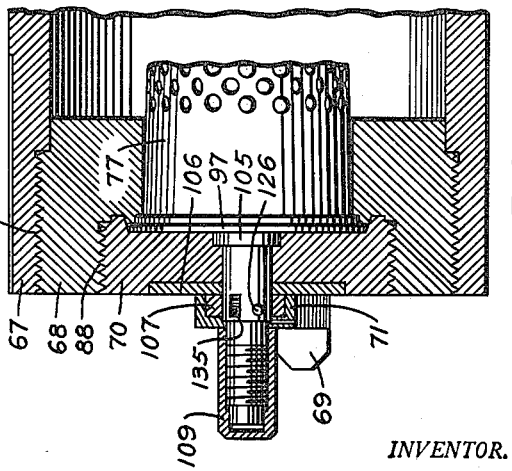
INVENTOR.
C. WALTON MUSSER.
BY
ATTORNEYS.

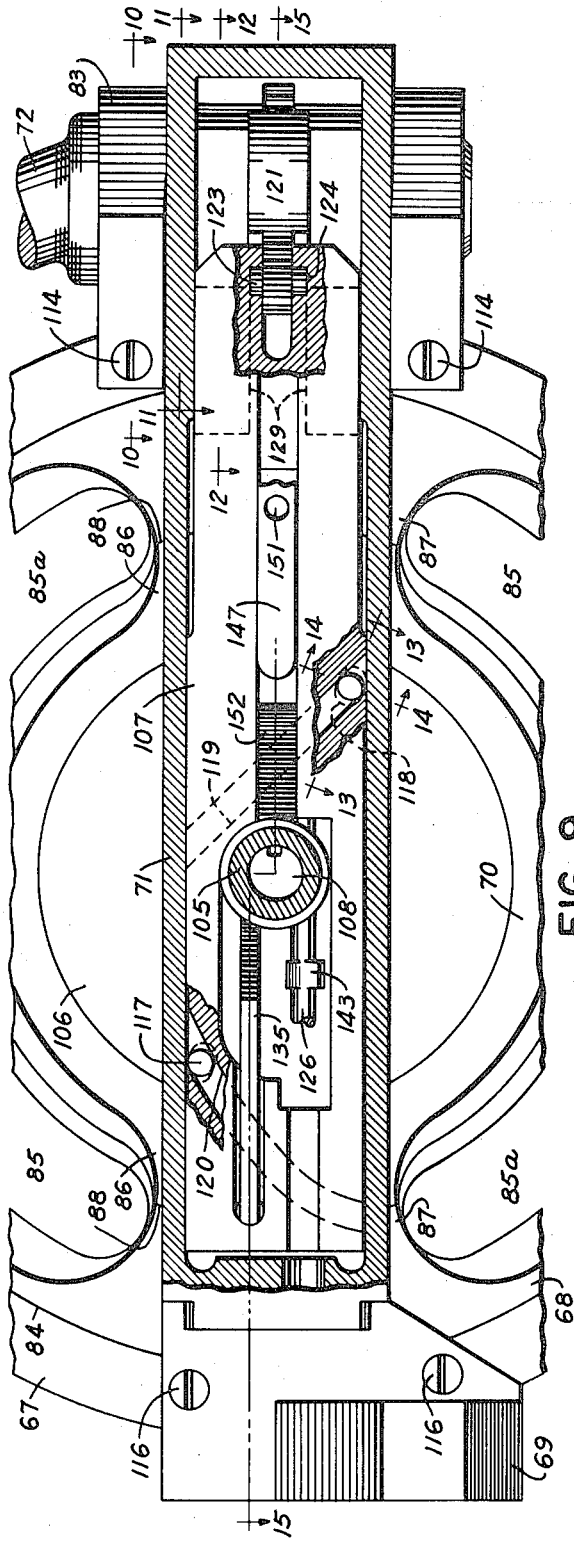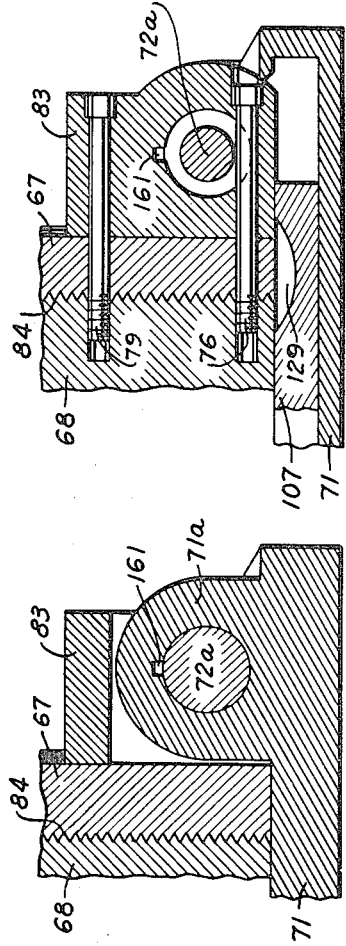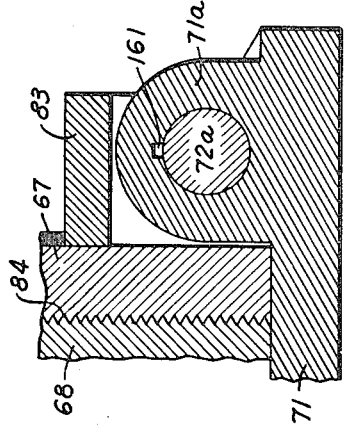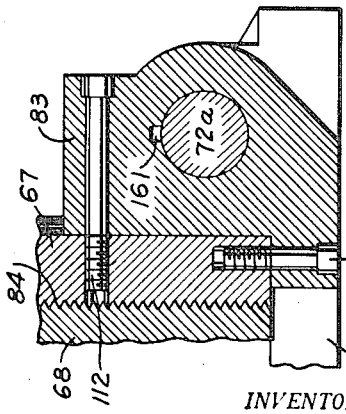

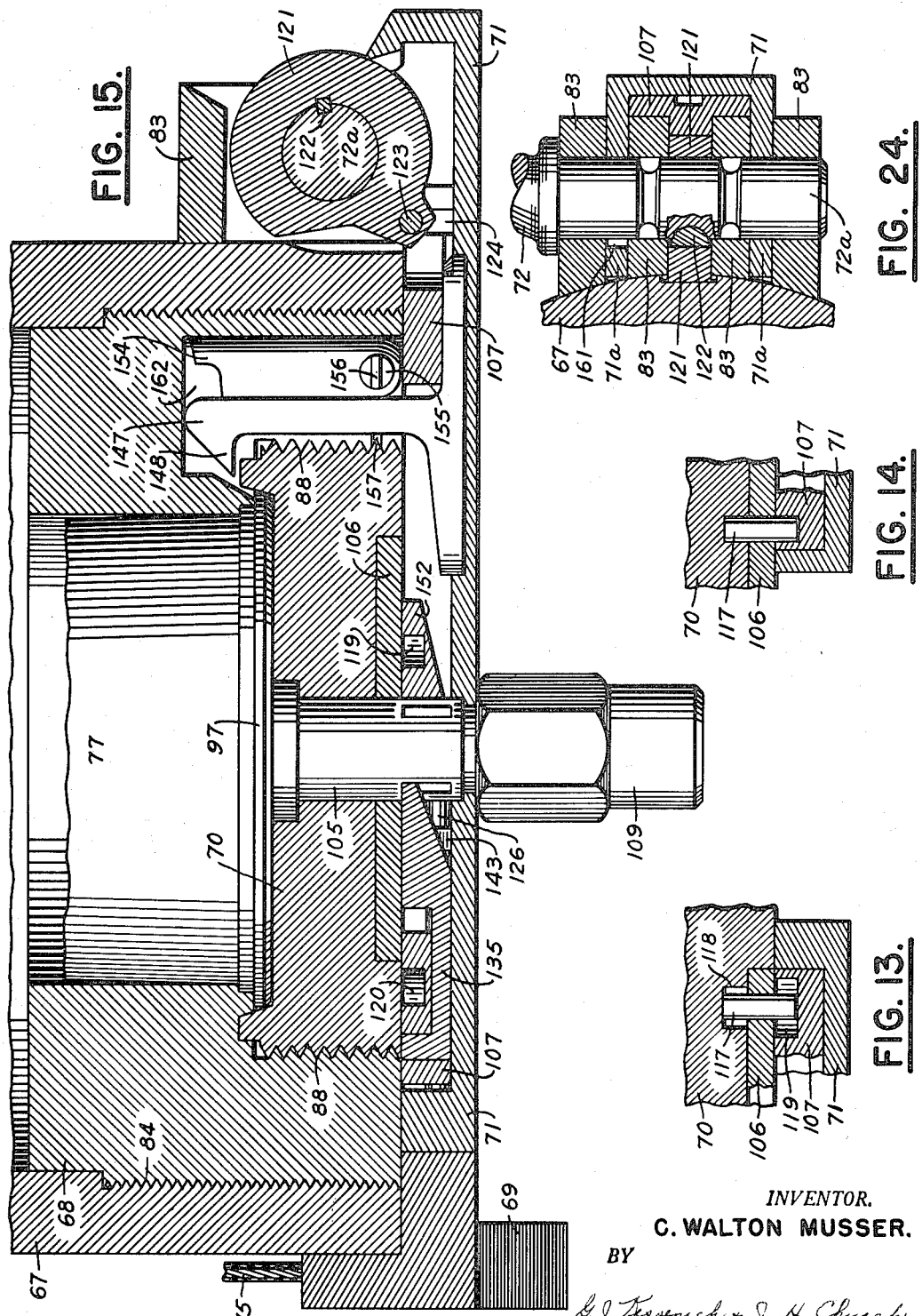

Feb. 7, 1956  C. W. MUSSER  2,733,639
BREECH MECHANISM FOR HEAVY CALIBER RECOILLESS GUN
Filed July 1, 1948  6 Sheets-Sheet 5
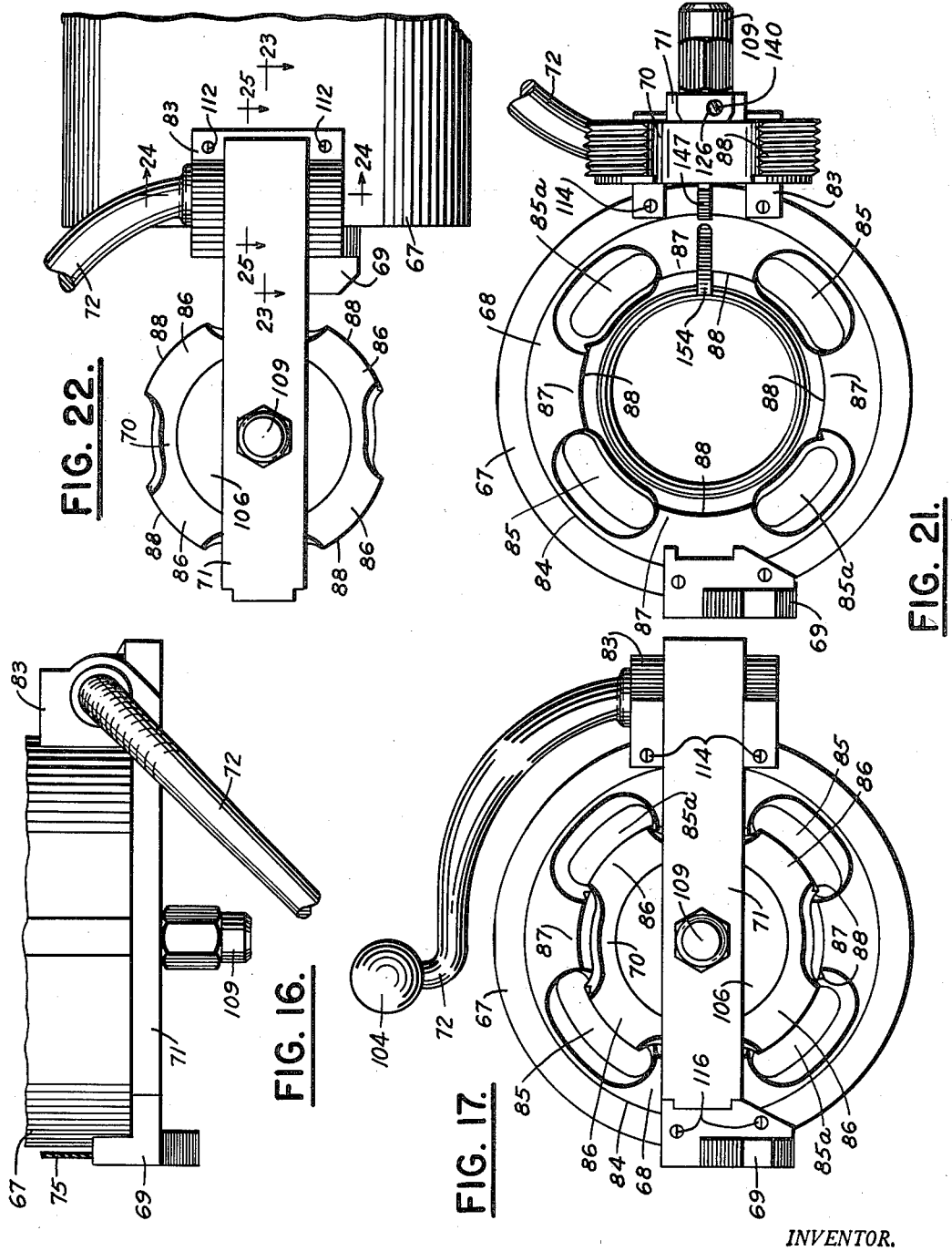
INVENTOR.
C. WALTON MUSSER.
BY
*G. J. Kessenich & J. H. Church*
ATTORNEYS.

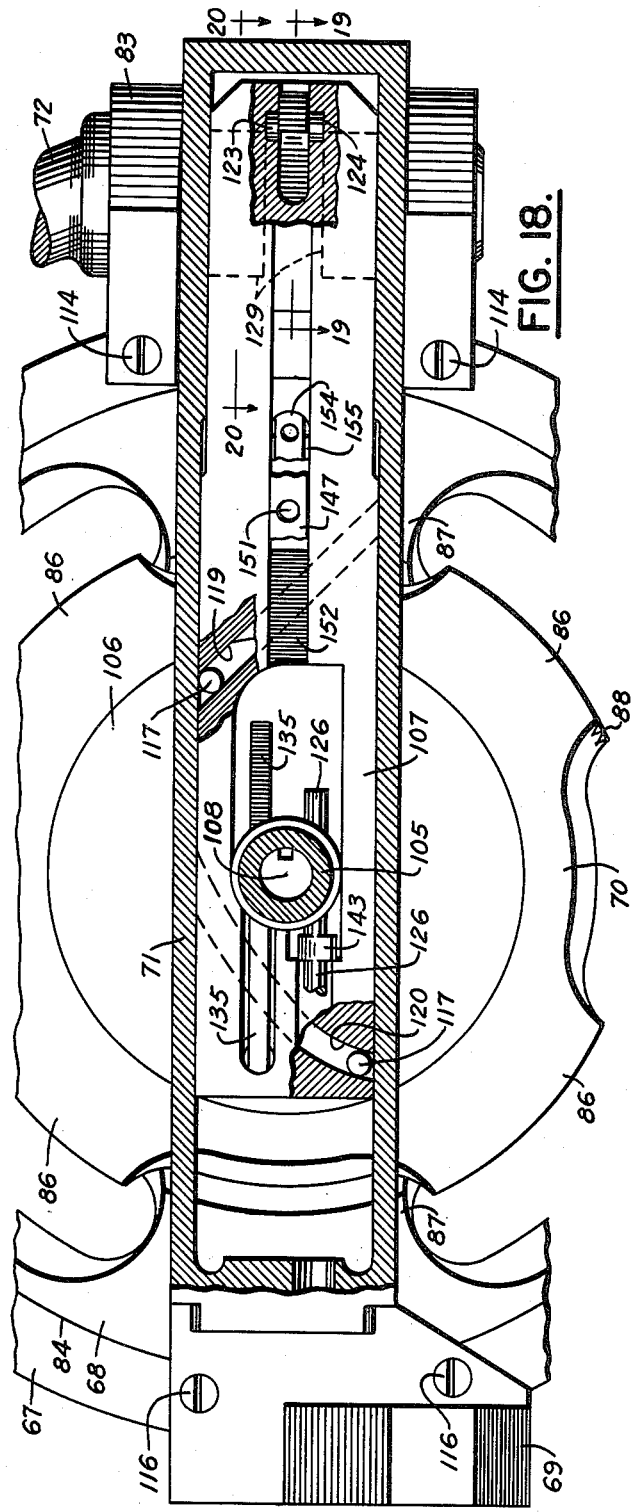
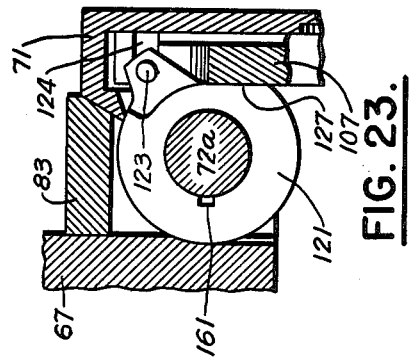
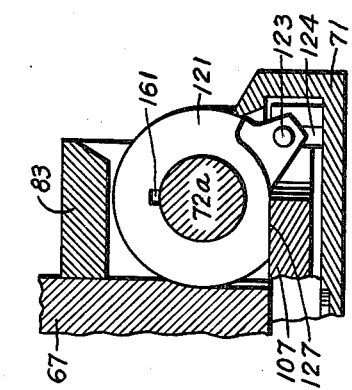
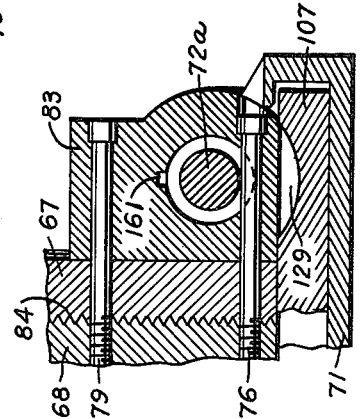

United States Patent Office 2,733,639
Patented Feb. 7, 1956

2,733,639

BREECH MECHANISM FOR HEAVY CALIBER RECOILLESS GUN

Clarence Walton Musser, Philadelphia, Pa., assignor to the United States of America as represented by the Secretary of War Application July 1, 1948, Serial No. 36,507

7 Claims. (Cl. 89—1.7)

(Granted under Title 35, U. S. Code (1952), sec. 266)

The invention described in the specification and claims may be manufactured and used by or for the Government for governmental purposes without the payment of any royalty thereon.

The present application is a continuation-in-part of application Serial No. 677,947 filed on June 20, 1946, now abandoned, in the name of Clarence W. Musser for "Heavy Caliber Recoilless Firearms."

This invention relates to breech mechanisms for guns of the recoilless type, and it has special reference to mechanisms usuable in non-recoil guns wherein the forces of rearward reaction that result from projectile discharge are neutralized by forwardly acting counterforces simultaneously set up by a rearward escape of propellent powder gas through openings or orifices in the gun's breech.

Broadly stated, the object of this invention is to provide improved breech mechanisms for heavy caliber recoilless guns which incorporate principles of construction earlier disclosed and claimed by the following co-pending applications: (a) Kroeger-Musser Serial 536,590 filed May 20, 1944, now abandoned, for "Recoilless Firearms"; Ammunition Thereof and Ballistic Design Thereof" (b) Kroeger-Musser Serial 577,830, filed February 14, 1945, now Patent No. 2,472,111, for medium caliber "Recoilless Firearm and Ammunition Therefor"; (c) Musser Serial 605,614 filed July 17, 1945, now Patent No. 2,456,011, for "Method and Apparatus for Aligning Pre-Engraved Projectiles in Rifled Firearms"; (d) Musser Serial 628,647 filed November 14, 1945, now Patent No. 2,444,949, for "Recoilless Firearm" with replaceable chamber reliner.

A more specific object is to make available an improved breech construction which reduces the time and skill required to safely load and fire recoilless weapons of heavy caliber typified by 105 millimeter barrel diameter.

Another object is to simplify the structure and reduce the number of parts needed by the gun's breech mechanism and to arrange those parts in a uniquely compact manner.

A further object is to provide "foolproof" constructions which assure simplicity of assembly and which make incorrect assembly impossible.

A still further object is to completely enclose the breech mechanism parts to assure trouble-free operation under all service conditions including the most adverse.

An additional object is to incorporate "double safety" features into the breech mechanism design.

Other objects and advantages will become apparent as the disclosure and description hereof proceed.

In accomplishing the foregoing, incorporation has been made in the new heavy caliber gun of the closed annular breech orifice, the "perforated cartridge case," the "torque compensation," the "tapered chamber," and the "replaceable reliner" principles which the co-pending applications earlier named broadly cover. In supplement thereto provision is made for improved breech mechanism constructions which are simpler, more compact and rugged, and which are coordinated in a unique way that permits quicker, safer and more convenient loading.

The invention itself, together with illustrative embodiments thereof, will best be understood from the following description when taken in conjunction with the accompanying drawings wherein:

Fig. 1 is a view in side elevation of a recoilless gun of 105 mm. caliber incorporating the inventive features hereof; the gun being shown as mounted on a two-wheeled carriage of the trailer type conventionally pulled by small automobiles such as the well-known "jeep";

Fig. 1A is an enlarged view of the hinge block and associated mechanisms shown in Fig. 1;

Fig. 2 is a view taken from line 2—2 of Fig. 1 to show the weapon in rear elevation with the breech block thereof fully closed;

Fig. 3 is an enlarged section on line 3—3 of Fig. 2 showing how the operating handle is related to certain cooperating parts;

Fig. 4 is a section on line 44 of Fig. 2 showing the taper of one of the breech locking lugs;

Fig. 5 is a longitudinal section on line 5—5 of Fig. 2 illustrating the internal construction of the gun's rear end and showing part of an ammunition round in place, the remainder of the gun's chamber and barrel having been omitted;

Fig. 6 is a similar section taken on line 6—6 of Fig. 2 to show the breech orifice opening and chamber reliner constructions;

Figs. 7 and 8 are enlarged sections on lines 7—7 and 8—8 of Fig. 1A showing how the hinge block is fastened to the chamber's right side;

Fig. 9 is an enlarged rear view of the breech actuating mechanism of Fig. 2 with portions cut away to show internal construction and with the parts in the "locked" handle position of Figs. 1 and 2;

Fig. 10 is a section on line 10—10 of Fig. 9 showing details of the hinge block and the handle stem;

Fig. 11 is a section on line 11—11 of Fig. 9 through the handle stem and the right end of the hinge;

Fig. 12 is a section on line 12—12 of Fig. 9 showing the right hinge undercut on the cam plate and how same permits breech block withdrawal only when the cam plate is properly positioned;

Fig. 13 is a section on line 13—13 of Fig. 9 showing one of the rollers by which the breech block is rotated by means of the coupling plate;

Fig. 14 is a section on line 14—14 of Fig. 9 through the same cam roller as viewed from a different angle;

Fig. 15 is a section on line 15—15 of Fig. 9 showing important internal constructions of the breech actuating mechanism;

Fig. 16 is a plan view showing of the breech end of the gun with the operating handle rotated to an "intermediate" position wherein the breech block is unlocked from the chamber;

Fig. 17 is a rear elevation view of the gun with the named parts in the "intermediate" position of Fig. 16;

Fig. 18 is a view corresponding to Fig. 9 but differing therefrom in that the breech mechanism parts are shown in the breech block unlocked or "intermediate" handle position of Figs. 16 and 17;

Fig. 19 is a section on line 19—19 of Fig. 18 showing breech mechanism parts as same apear when the cam plate has been moved to the breech unlocked position by the operating handle;

Fig. 20 is a section on line 20—20 of Fig. 18 constituting a counterpart of Fig. 12 and showing the relation of the cam plate undercut to the hinge block;

Fig. 21 is a rear elevation of the gun showing the breech block and associated mechanism in the "fully opened" position;

Fig. 22 is a right-side view of the gun's breech end with the breech block and associated parts also fully withdrawn;

Fig. 23 is a section on line 23—23 of Fig. 22 showing the position of the cooperating parts when the breech block is in the fully withdrawn position (note that Fig. 23) has been turned 90° from the Fig. 22 position as seen by the reader in order to show relative positions of the hinge bar with respect to the gun's chamber by comparison with Figs. 19 and 20 on the same sheet);

Fig. 24 is a section on line 24—24 of Fig. 22 showing how the operating handle is keyed to the dog by which the cam plate is operated;

Fig. 25 is a section on line 25—25 of Fig. 22 constituting a further progression from Figs. 12 and 20 and showing the cam plate interlocking with the hinge block in the open breech position (note that Fig. 25 has been turned 90° from the Fig. 22 position as seen by the reader for the same reason of comparision mentioned above in describing Fig. 23).

The complete recoilless gun

The inventive improvements hereof are illustratively disclosed as being incorporated in a military weapon of 105 mm. caliber capable of a completely recoilless firing of projectiles (not shown). As explained at length in the aforementioned parent application the illustrated gun is of extremely light weight and may be fired from a small vehicle such as the well known "jeep" (not shown), or from the illustrated bi-wheel carriage mount 63 or even from a tripod support (not shown). The illustrated gun support 63 of Fig. 1 utilizes handwheels 64 and 65 for enabling the weapon accurately to be positioned both in azimuth and in elevation. When supported in the named or other equivalent manner the new gun may with complete safety to the user be fired with great accuracy and high military effectiveness.

As the present application is intended to disclose the breech mechanism primarily, the remainder of the gun will only be described in the present application in sufficient detail so as to orient an understanding of the breech parts.

The illustrative recoilless gun here shown comprises a barrel 66; an enlarged chamber 67 secured to the rear of this barrel and having the tapered shape represented; a removable liner 68 secured in the rear of the chamber; a breech block 70 partially closing the rear opening of the liner; a hinge bar support 71 for the breech block; and an operating handle 72 for that support. Also included but not to be described in the present application are a trigger (not shown) and housing 69 therefor for firing the weapon, and a sight 74 for aiming the gun in conventional manner.

The ammunition usable with the illustrated gun is similar to that first disclosed in the aforementioned co-pending application Serial 536,590, and includes the "perforated cartridge case" shown at 77 in the drawings hereof. This ammunition (the projectile of which is not shown) is loaded into the illustrated weapon from the breech thereof in a manner presently to be explained.

The breech block and chamber reliner

The rear or breech end of gun chamber 67 is provided with a removable ring-shaped "reliner" 68 which serves to prolong the weapon's useful life in the manner taught by co-pending Musser application Serial 628,647. Attachment of this reliner to the chamber interior is effected through threads 84 which provide with the chamber a juncture of axial length sufficient to afford a gas-tight seal without gasketing. In the installed position shown, reliner 68 is prevented from turning with respect to chamber 67 by two sets of cap screws 76 and 79 which extend through the chamber wall into the reliner in a manner shown by Figs. 7 and 8. These cap screws further hold a hinge block 83 (later to be described) against the chamber's right side.

As the drawings show, the gun's breech block 70 is removably secured within the rear of chamber reliner 68 and constitutes only a partial closure therefor (see Figs. 2, 6, 17, and 21). This member 70 takes the form of a cylindrical block which is radially spaced from the inner wall of reliner 68 in a manner to form a substantially annular orifice or venturi 85 that leads from the chamber's interior to the rear exterior of the gun. Figs. 2, 6, 17, and 21 show that this annular orifice is divided into four sections; and the same views plus 4, 9, 15, 18, and 22 show that the breech block tapers inwardly from front to rear.

The outer rear contour of each of these four orifice sections 85—85a is defined by the removable reliner 68, as Figs. 2, 6, and other related views clearly show. Only the inner rear contour of each of these orifice sections is defined by the tapered breech block 70. A major portion of erosive wear is therefore received by the replaceable reliner (in a manner earlier disclosed by co-pending Musser application Serial 628,647) leaving the breech block relatively free from harmful effects by the powder combustion gases which escape through orifice openings 85—85a.

Four locking lugs shown at 86 in each of Figs. 2, 17, 18, and 22 extend radially from the central body portion of breech block 70 (as taught by co-pending applications Serial 536,590 and Serial 577,830) and interfit with mating protrusions 87 (again see the figures just named) on the reliner wall interior (as taught by co-pending application Serial 628,647). Each locking lug 86 carries threads on the periphery thereof, as best shown in Figs. 15 and 21, and each mating protrusion 87 is provided with similar threads indicated at 88 in Figs. 5 and 15. When these two sets of threads are engaged as shown in Figs. 2, 5, and 15 they securely lock the breech block 70 within the rear interior of chamber reliner 68.

The chamber reliner wall spaces which circumferentially separate the locking protrusions 87 have a diameter larger than the maximum for the breech block lugs 86, and this relation enables free longitudinal movement by these lugs through the spaces named. This movement is utilized in inserting the breech block within the chamber reliner and also in withdrawing the block therefrom, all in a manner presently to be described.

When inserted and locked within the chamber reliner 68, as shown in Figs. 2, 5, 9, and 15, this breech block 70 constitutes a firm support for the ammunition which it helps to position within the weapon. The steel of the central core structure is of sufficient thickness and strength to withstand, with a factor of safety of well over two, the maximum rearward stress exerted thereon during firing.

It will be noted from Figs. 5, 6 and 15 that when an ammunition round has been loaded into the gun the ammunition's cartridge case 77 is supported centrally with respect to the walls of chamber 67 therearound. Such central positioning is important for reasons clearly set forth in the aforementioned parent application, and is effected by the rear chamber reliner 68 constituting the represented opening through which the projectile (not shown) and cartridge case 77 are inserted in loading the weapon. The breech block 70, moreover, has a mating recess which further receives the cartridge case head 97 during loading, and upon locking of the block in position (as shown in Figs. 5, 6 and 15) abuts against the case head thereby restraining same against backward movement.

The annular breech orifice and recoil neutralization

The 105 mm. recoilless gun illustratively here shown effects recoil neutralization in the unique manner taught by co-pending Kroeger-Musser application Serial No. 536,590; that is, the forces of rearward reaction are neutralized by forwardly acting counterforces produced by rearward escape of generated powder gas through the earlier indicated annular orifice openings 85—85a (see Figs. 2, 6, and 21) between the gun's breech block 70 and the rear interior of chamber reliner 68 wherein this block is secured.

As is most clearly illustrated by Figs. 2, 17, and 21, this annular orifice extends all the way around the breech block's central core and is obstructed only by the four radial lugs 86 which engage with the four mating protrusions 87 of chamber reliner 68. All circumferential space between these lugs thus constitutes the named annular orifice 85—85a (see Figs. 6 and 21) which lead from the interior of chamber 67 rearwardly to the exterior of the gun.

Co-pending Kroeger-Musser application Serial No. 536,590 explains that for complete neutralization of recoil there exists an optimum ratio between the bore area of the gun's barrel 66 and the throat area of the breech orifice openings 85—85a. In the improved gun here illustratively disclosed, the chamber reliner 68 which is employed is manufactured to specifications which include the pre-determined optimum ratio for practically zero recoil, and it therefore needs no adjustment when installed in the gun. The gun's operation and performance follow principles more fully enunciated by co-pending Musser application Serial 628,647 by which use of this replaceable type of chamber reliner was first proposed.

The improved breech mechanism

The 105 mm. recoilless weapon here shown is provided with a breech mechanism which incorporates a number of significant and highly practical improvements. These improvements make it possible to reduce the time and skill required to safely load the weapon; they insure trouble-free operation under all service conditions including the most adverse; they impart "double-safety" features to all critical part operations; they assure compactness plus simplicity of assembly and are so "foolproof" as to make incorrect assembly impossible; and they accomplish the foregoing without sacrificing the advantages of light weight, minimum number of parts, ruggedness, and simplicity of action.

The essential breech operating parts involved include the breech block 70 earlier mentioned; the operating handle 72 supported from the right rear of gun chamber 67 through hinge block 83; the hinge bar 71 through which a rearward movement of handle 72 effects withdrawal of breech block 70 from the chamber; a hammer housing 105 (see Figs. 5, 6, and 15) which supports breech block 70 from hinge bar 71 in a manner permitting block rotation; a plate-like coupling ring 106 through which locking and unlocking rotations are transmitted to block 70; and a cam plate 107 (see Figs. 9, 15, and 18) which effects rotation of the breech block in response to movements of handle 72.

The breech block's hinge mounting

Explanation has already been given of how the breech block 70 is secured in the rear of chamber 67 by the aid of that block's locking lugs 86 and the mating protrusions 87 on the interior of reliner 68. In the "engaged" position represented by Figs. 1, 2, 5, 6, 9, and 15, this support is all that is needed to hold the breech block in place and it is fully adequate to restrain the maximum chamber pressure which combustion of the propellent charge (not shown) sets up.

To facilitate loading and removal of the cartridge case 77 after firing, provision is made for releasing this breech block 70 from its chamber reliner attachment, rearwardly withdrawing it from the chamber 67, and swinging it out of alignment with the chamber interior to the right-hand position shown by Fig. 21. The earlier mentioned hinge bar 71 comes into play during these actions.

The right end of this bar fits into hinge block 83 in the manner shown by Figs. 1, 2, 3, 7, and 15 through 23. As earlier mentioned the block 83 is securely bolted to the right rear of gun chamber 67. Aiding this attachment are cap screws 79 (see Figs. 1A–8) earlier mentioned, plus a companion pair of cap screws 112 at the block's front, plus a third pair of cap screws 76 at the block's rear also extending through chamber 67 and into reliner 68, plus a fourth pair of cap screws 114 holding the hinge block's rear flange against the end of chamber 67 as shown in Figs. 2, 9, 17, 18, and 21.

Contributing to this mounting is the lower end of handle 72 which projects downwardly through the hinge block 83 and engages with mating openings in upper and lower portions 71a (Fig. 24) of the hinge bar as best shown by Figs. 3 and 22. This juncture enables the bar 71 to hinge around handle shaft 72a (see Figs. 10, 11, 12, 15, 19, 20, 23, and 25) from the fully closed position of Figs. 1 and 2 progressively to the fully opened position of Figs. 21 and 22.

Once assembled as shown in Fig. 3 the handle shaft 72a is held in place by interfitting of cap screws 76 into the represented mating circumferential grooves of the shaft. This holds the working parts in their proper place and at the same time facilitates disassembly and reassembly, as will later be explained.

Breech block rotation by handle movement

All rotations necessary to lock and unlock breech block 70 are imparted thereto by the gun's operating handle 72 through mechanism which will now be described. In the fully closed and locked position of Figs. 1 and 2 and related views the handle 72 is at its limit of forward travel; in the block closed but unlocked position of Figs. 16, 17, and 18 the handle 72 has been moved rearwardly to its intermediate position; and in the fully withdrawn block position of Figs. 21 and 22 the handle has been further moved rearwardly and to the right to its limit of rearward or opening travel.

For transmitting the named rotative movements from handle 72 to the block 70 use is made of the earlier mentioned cam plate 107 which is slidably housed in and surrounded on all sides except the front by the hinge bar 71; the coupling ring 106 which carries a pair of diametrically opposed pins 117 (see Figs. 9, 13, 14, and 18) extending at their forward ends into mating slots 118 (see Fig. 9) in the breech block and engaging at their rear ends with a pair of inclined slots 119 and 120 (see Figs. 9 and 18) in the forward face of the laterally movable cam plate 107; and a dog 121 (see Figs. 1A, 3, 9, and 15) which is keyed to handle shaft 72a at 122 (see Figs. 15, 19, and 23) and which carries on its rear side a pin 123 (see Figs. 9, 15, 18, 19, and 23) which engages with mating slot 124 (see Figs. 15 and 18) in the extreme right end of cam plate 107.

Through this dog 121 and pin 123 rotative movements of the gun's operating handle are translated into lengthwise movements on the part of cam plate 107. Thus, when handle 72 occupies the extreme forward position of Figs. 1, 2, 9, and 15, the cam plate 107 is moved to its extreme left position in hinge bar housing 71, however, upon rearward movement of the handle to the intermediate position of Figs. 16 and 17 the cam plate 107 is pulled by dog pin 123 to the extreme right position shown by Figs. 18 and 19. Return of handle 72 to the forward position of Figs. 1 and 2 pushes the cam plate 107 back to the extreme left position of Figs. 9 and 15.

In so moving endwise with respect to the hinge bar housing 71 the cam plate 107 imparts to breech block 70 the desired locking and unlocking rotative motions. As earlier indicated, this conversion of endwise movement by cam plate 107 into rotative movement by breech block 70 is accomplished through the medium of cam plate slots 119—120, cooperating pins 117 that extend into the breech block, and coupling plate 106 that holds these pins in such a way as to absorb all lateral thrust exerted on the pins and impart only rotative motion to the breech block.

The locked or fully closed position of breech block 70 is effected when the cam plate is in its extreme left position as shown by Fig. 9. Movement of the cam plate to the right position of Figure 18 causes pins 117 to slide in slots 119—120 in such a way as to rotate the breech block counterclockwise to the unlocked position of Figs. 17–18. Return of the cam plate to the extreme left position of Fig. 1 rotates the breech block clockwise back to the locked position of Figs. 2 and 9.

By reason of the coupling ring 106 absorbing all side thrust and by further reason of the pins 117 carried by this plate extending into the oblong openings 118 in the breech block, that block is kept free to occupy the central position so essential for free rotation and easy action of the gun parts.

It will be noted that whereas cam plate slot 119 is straight the companion slot 120 is curved. This curvature is made necessary by the arc through which breech block pins 117 travel during the rotative actions named. The curvature could, of course, be equally divided between slots 119 and 120, but for reasons later to be made evident it is preferred to keep slot 119 straight and allot all of the required curvature to slot 120. Without this curvature, binding or jamming of the parts would result to such an extreme degree as to make desired operation impossible.

*Hinge opening and closing by handle movement*

To swing the hinge bar 71 and associated parts outwardly from the closed position of Figs. 1, 2, 5, and 9 etc., to the open position of Figs. 21–22 it is necessary only to swing handle 72 from the intermediate position of Figs. 16 and 17 to the extreme limit of opening travel shown by Figs. 21 and 22. Opening of the hinge structure starts only after handle 72 has been pulled backwardly beyond the intermediate position of Fig. 16. In that intermediate handle position the hinge structure parts are as shown by Figs. 18, 19, and 20.

Under this condition the cam plate 107 has been moved by dog 121 and pin 123 to the extreme right-hand position shown by Fig. 18; and a flat portion of the dog has now been rotated into abutting contact with cam plate 107 as indicated at 127 in Fig. 19. As earlier explained, the breech block 70 occupies the "unlocked" rotative position of Figs. 17–18 and in all respects the hinge structure is now completely free for withdrawal from the gun chamber 67.

Such withdrawal is effected by further rearward movement of handle 72 from the intermediate position of Figs. 16–17 to the extreme open chamber position of Figs. 21 and 22. By reason of the contact 127 between dog 121 and cam plate 107 which Fig. 19 indicates, further counterclockwise rotation of that dog is directly transmitted to hinge structure 71. Hence, the further backward handle movement just named swings the hinge structure around the lower portion of handle 72 as a turning point.

This swinging first withdraws the left end of hinge bar 71 from engagement with trigger mechanism (not shown) and then moves the hinge bar to the fully open position of Figs. 21, 22, and 23. Upon arriving at this fully open position further movement of both handle 72 and hinge bar 71 is arrested by contact of the right end of that bar with the hinge block 83 as indicated at 128 in Fig. 25.

The hinge bar 71, breech block 70 and other associated parts are now fully withdrawn from the gun chamber 67 as shown by Figs. 21 and 22. Insertion of an ammunition round (only the cartridge case 77 thereof is shown) into the gun chamber or withdrawal of a fired cartridge case 77 from that chamber now becomes possible. In this fully open position, moreover, the rounded exterior of hinge block 83 is accommodated by the recesses 129 in the extreme right end of cam plate 107 as shown in Fig. 25.

The progression by which this mating is accomplished is represented by Figs. 20 and 25. Fig. 20 shows how a portion of the cam plate 107 is cut away through a circular contour 129 which accurately matches the radius of hinge block 83's curved exterior. As the hinge bar 71 is rotated by handle 72 from the closed breech position of Fig. 18 to the open position, the cut away portion 129 of cam plate 107 swings around the outside of hinge block 83 as shown by Fig. 25.

In order to close the hinge structure it is now necessary only to return handle 72 from the fully open position of Figs. 21 and 22 back to its intermediate position of Figs. 16 and 17. Such operation of the handle rotates dogs 121 clockwise thereby causing pin 123 to exert on slot 124 in cam plate 107 a force tending to push the cam plate toward the left end of hinge bar 71. By reason, however, of the mating engagement of cam plate 107 with the rounded exterior of hinge block 83 movement of the plate cam in hinge bar 71 is rendered impossible, and instead the force exerted by the dog pin (see Fig. 19) is converted into a torque exerted on the entire hinge structure in a way that rotates same around the lower portion of handle 72 as a turning point.

This rotation is clockwise and it progressively advances the hinge structure from the fully open position of Figs. 21 and 22 to the closed hinge position of Figs. 18, 19, and 20. In this closed hinge position the left end of hinge bar 71 has reengaged with the aforementioned trigger mechanism (not shown). The breech block 70 continues to occupy the unlocked rotative position of Figs. 17 and 18; the cut away portion 129 of plate cam 107 has disengaged itself from the circular exterior of hinge block 83 as shown in Fig. 20; and the cam plate 107 and cooperating parts are now again occupying the positions best indicated by Fig. 18. Under these conditions handle 72 occupies the intermediate position represented by Figs. 16 and 17.

As handle 72 is further advanced to its extreme of forward travel as shown in Figs. 1 and 2, the following actions take place. Cam plate 107 is by dog 121 and pin 123 moved from the extreme right position of Fig. 18 to the extreme left position of Figs. 9 and 15. In consequence of this movement cam plate slots 119 and 120 rotate breech block 70 clockwise causing the four peripheral locking lugs 86 to move into mating engagement with the chamber liner protrusions 87 and thereby secure the breech block in the rear of gun chamber 67 as shown by Figs. 2, 9, and 15.

In addition, the cam plate 107 and other mechanisms (not shown) cooperate to actuate trigger and firing mechanisms (not shown). The details of this action are fully described in the aforementioned parent application. It will here suffice to say that the same handle 72 and hinge bar 71 movements which open, close, lock and unlock the breech block 70 simultaneously prepare the firing mechanism for operation.

Also cooperating with the breech block and other earlier described mechanisms, is a new and improved cartridge case extractor 147 and a detent cartridge case holder 154 (see Figs. 15 and 18). The details of the extractor and case holder need not here be described for they are fully illustrated and explained in the aforementioned parent application. It will suffice here to say that the extractor uniquely cooperates with the breech block so that the extractor's action is at all times positive and reliable yet does not interfere with other gun operations when not required to withdraw a case from the gun. The detent case holder serves a valuable function in holding cartridge cases in place within the gun at times when the weapon is at a selected firing elevation which normally would cause the heavy ammunition round to fall out of the gun before the breech block could be closed and the weapon otherwise fully conditioned for firing.

*Operation and safety features of the breech mechanism*

From the foregoing it will be seen that there has been provided an improved breech mechanism which offers important advantages in the loading and unloading of open breech recoilless guns. To place the ammunition round (only the cartridge case 77 thereof is shown) within the weapon it is merely necessary to pull operating handle 72 to its extreme rear position thereby unlocking breech block 70, withdrawing it from chamber 67 and further swinging it completely free of the chamber opening as shown in Figs. 21 and 22.

The ammunition round is now inserted into the open chamber at the rear of the barrel bore (not shown). A forward thrust is given the ammunition round until the rim of the cartridge case head 97 abuts with the mating shoulder on chamber reliner 68 as shown in Figs. 5, 6, and 15. The case detent 154 now holds the ammunition round in this position.

The breech block 70 is now moved to the closed position by swinging handle 72 to its extreme forward position wherein locking of the breech block 70 in the chamber takes place, and other actions earlier described in detail also are performed. In approaching and engaging with the cartridge case head 97 the flared recess in the breech block's front comes into abutment with the head and thereby directly restrains the case against rearward movement.

After the ammunition round is fired (by means not here shown or described, but amply illustrated and described in detail in the aforesaid parent application) it becomes necessary to open the breech block, withdraw the cartridge case 77 and thus prepare the gun for re-loading. This is done by merely swinging handle 72 to the extreme rear position of Figs. 21 and 22, thereby unlocking the breech block 70 and withdrawing same from the chamber 67. As this withdrawal is made the extractor fixture 147 pulls the fired case 77 sufficiently out of the chamber to make full manual removal easily possible.

It will be understood from the foregoing description and accompanying illustration (and even more so from the aforesaid parent application) that the design of the present gun offers a minimum of opportunity for unauthorized tampering by the gun user, thereby contributing to the advantages of safety. All the moving parts are easily assembled and (including the firing mechanism not described in the present application) are enclosed in the hinge bar 71 and in other ways, and hence are safeguarded from mechanical injury or unauthorized contact. In consequence the new breech operating mechanism is capable of withstanding rough handling and other abuse, and provides trouble-free operation under all service conditions including the most adverse.

*Miscellaneous parts associated with breech mechanism*

A number of miscellaneous parts associated with the above described breech mechanism, including parts comprising the trigger, fired case extractor and case retention mechanisms, are illustrated in whole or in part by the drawings. None of these parts have been described hereinbefore as they are not part of the particular invention to which the present specification and claims have been directed. Of course, all these parts are fully described in the aforementioned parent application. However, in order to facilitate an understanding of the relationship between those as yet unnamed parts and the parts of the breech mechanism which have been fully described above, certain related parts have been given appropriate reference characters and will now be identified.

The trigger housing 69 appears in Figs. 1, 1A, 5, 6, 9, 15 to 18 inclusive, 21 and 22. Screws 116 which hold trigger housing 69 to chamber 67 are shown in Figs. 2, 9, 17 and 18. A cocking cam 135 which serves to cock the firing pin hammer 108 appears in Figs. 5, 9, 15 and 18. The firing pin hammer 108 itself appears in Figs. 9 and 18. A sear 126 is represented in Figs. 5, 9, 15, 18 and 21. Earlier mentioned was a detent cartridge case holder 154. This holder has a fulcrum 155 shown in Figs. 7, 15 and 18, fulcrum tongues 156 illustrated in Figs. 7 and 15, and accommodating those tongues are tongue slots 157 provided in reliner 68 as shown in Figs. 7 and 15. A recess 162 in reliner 68 is shown in Figs. 8 and 15 as providing space for reception of the case extractor 147 and the detent case holder 154. A knob 104 is provided as shown in Figs. 1, 2 and 17 for convenience in grasping the operating handle 72. The number 143 which appears in Figs. 9, 15 and 18 represents the sear shank. The number 152 shown in Figs. 9, 15 and 18 depicts the angular groove portion of plate cam 107. Reference character 151, shown in Figs. 9 and 18, applies to the spring plug in the extractor 147. In Figs. 10, 11, 12, 19, 20, 23, 24 and 25 the reference character 161 indicates a slot or keyway for assembling key 122 into the dog 121. Figs. 15 and 16 show a lanyard represented by reference character 75. A hook 148 for extractor 147 is indicated in Fig. 15. Lastly, the sear tongue is identified by reference character 140 in Fig. 21.

*Summary*

The earlier described qualities of superior breech operating mechanism design are the direct result of the several improvements here disclosed. The individual features of such improvements are numerous and in the complete weapon these features effect the named result through cooperations and interactions that are both unique and novel.

It will by now have become apparent that these breech operating mechanism improvements may also be applied to guns of sizes, characters and shapes other than the one here disclosed, and that the represented 105 mm. open-breech weapon thus has been chosen only to illustrate and not to limit the inherently wide application and scope by which these improvements are characterized.

From the foregoing it will thus be seen that the here disclosed improvements have enabled the provision of superior breech mechanism designs in heavy caliber recoilless guns which incorporate principles of construction previously disclosed and claimed by the four co-pending applications earlier listed herein; that these same improvements have made available a unique gun construction which reduces the time and skill required to safely load recoilless weapons of heavy caliber typified by 105 mm. barrel diameter; that the improvements have resulted in simplifying the structure and reducing the number of parts needed by the gun's breech mechanism and have provided a uniquely compact arrangement for those parts; that they have enabled such complete enclosure of the breech mechanism parts as will assure trouble-free operation under all service conditions including the most adverse; and that they have provided for the guarding of all critical parts of the breech operating mechanism against possible mechanical damage due to rough handling and other abuse.

The inventive improvements here disclosed thus are capable of wide application and hence are not to be restricted to the specific form here shown and described by way of illustration.

I claim:

1. In a gun, the combination of a chamber, a breech block movable into and out of the rearward portion of said chamber and being secured therein when rotated to a locked position and freed from withdrawal therefrom when rotated to an unlocked position, a support on one side of the rear chamber wall, a hinge bar extending radially from the center of said breech block to said support and permitting rotative movement of the block within the chamber plus complete withdrawal therefrom, an operating handle pivoting said hinge bar to said support and usable under proper conditions to swing the bar and breech block toward and away from said chamber's rearward end, a cam plate carried by said hinge bar and disposed for slidable movement by said handle lengthwise of said hinge bar when that bar and said breech block are closed against the chamber end and carrying inclined cam slots which align with diametrically opposed parts of said breech block, supporting means positioned between said cam plate and breech block, and diametrically opposed pins protruding from said supporting means into engagement with said cam slots whereby lengthwise movement of said cam plate one way rotates said supporting means thereby rotating the breech block to said locked position by use of turning forces applied through said pins at diametrically opposed places on the breech block while lengthwise movement of the cam plate the other way rotates the breech block to said unlocked position also by use of other turning forces applied through said pins at diametrically opposed places on the breech block.

2. In a gun, the combination of a chamber, a breech block movable into and out of the rearward portion of said chamber and being secured therein when rotated to a locked position and freed for withdrawal therefrom when rotated to an unlocked position, a support on one side of the rear chamber wall, a hinge bar extending radially from the center of said breech block to said support and permitting rotative movement of the block within the chamber plus complete withdrawal therefrom, an operating handle pivoting said hinge bar to said support, a cam plate carried by said hinge bar and disposed for slidable movement by said handle lengthwise of said hinge bar and carrying inclined cam slots which align with diametrically opposed parts of said breech block, a coupling ring rotatively positioned between said cam plate and said breech block in coaxial relation to that block, and diametrically opposed pins carried by said coupling ring and protruding into engagement with said cam slots on one side of the ring and into engagement with enlarged mating openings in said breech block on the other side of the ring whereby lengthwise movement of said cam plate one way rotates said coupling ring thereby rotating the breech block in said locking direction by use of turning forces applied through said pins at diametrically opposed places on the breech block, but without imparting side thrust to said breech block while lengthwise movement of the cam plate the other way rotates said coupling ring in the opposite direction thereby rotating the breech block in said unlocking direction also by use of other turning forces applied through said pins at diametrically opposed places on the breech block, but also without imparting side thrust to said breech block.

3. In a gun, the combination of a chamber, a breech block movable into and out of the rearward portion of said chamber and being secured therein when rotated to a locked position and freed for withdrawal therefrom when rotated to an unlocked position, a hinge bar rotatively supporting said breech block at its center and extending across the chamber end, an operating handle pivoting one end of said hinge bar to a hinge support on one side of the chamber wall and effective to swing the bar and breech block toward and away from the chamber end, support means on the opposite side of said chamber engageable by said hinge bar's free end, a cam plate carried by said hinge bar and disposed for slidable movement by said handle lengthwise of said hinge bar and carrying inclined cam slots which align with diametrically opposed parts of said breech block, a coupling ring rotatively positioned between said cam plate and said breech block in coaxial relation to the latter, and diametrically opposed pins extending through said coupling ring and protruding into engagement with said cam slots on one side of the ring and into engagement with enlarged mating openings in said breech block on the other side of the ring whereby lengthwise movement of said cam plate one way rotates said coupling ring thereby rotating the breech block in said locking direction by use of turning forces applied through said pins at diametrically opposed places on the breech block, but without imparting side thrust to said breech block while lengthwise movement of the cam plate the other way rotates said coupling ring in the opposite direction thereby rotating the breech block in said unlocking direction also by use of other turning forces applied through said pins at diametrically opposed places on the breech block, but also without imparting side thrust to said breech block.

4. In a gun, the combination of a chamber, a breech block movable into and out of the rearward portion of said chamber, a hinge bar rotatively supporting said breech block at its center and extending across the chamber end, an operating handle pivoting one end of said hinge bar to a support on one side of the rear chamber wall, a cam plate carried by said hinge bar and disposed thereon so as to be movable by said handle lengthwise of said hinge bar when that bar is closed against the chamber end, means actuated by said cam plate movement for rotating said breech block between locked and unlocked positions within the chamber by application to the breech block of turning forces applied at diametrically opposed places on the breech block, means effective when said cam plate reaches its limit of lengthwise travel in the breech block unlocking direction for directly coupling said handle to said hinge bar whereby further handle movement in the block-unlocking direction swings said hinge bar and breech block outwardly away from the chamber end, and means effective as long as said hinge bar is separated from the chamber end for continuing said direct handle-to-hinge bar coupling whereby movement of said handle in the breech block locking direction first closes said hinge bar against the chamber end and then rotates the breech block to its said locked position within the chamber by application to the breech block of other turning forces applied at diametrically opposed places on the breech block.

5. In a gun, the combination of a chamber, a breech block movable into and out of the rearward portion of said chamber, a hinge bar rotatively supporting said breech block at its center and extending across the chamber end, an operating handle pivoting one end of said hinge bar to a support on one side of the chamber wall and usable to swing the bar and breech block toward and away from said chamber's rearward end, a cam plate carried by said hinge bar and disposed thereon so as to be movable by said handle lengthwise of said hinge bar when and only when that bar is closed against the chamber end, means associated with said cam plate and responsive to movement by said cam plate for rotating said breech block between locked and unlocked positions within the chamber by use of turning forces applied through said rotating means at diametrically opposed places on the breech block, and means effective when said cam plate reaches its limit of travel in the block-unlocking direction for causing further movement of said handle in that direction to swing said hinge bar outwardly away from the chamber end thereby withdrawing said breech block from the chamber with that block continuously held in the unlocked rotative position.

6. In a gun, the combination of a chamber, a breech block movable into and out of the rearward portion of said chamber, a hinge bar rotatively supporting said breech block at its center and extending across the chamber rearward end, an operating handle pivoting one end of said hinge bar to a support on one side of the chamber wall and usable to swing the bar and breech block toward and away from said chamber's rearward end, a cam plate carried by said hinge bar and disposed thereon so as to be movable by said handle lengthwise of said hinge bar when that bar is closed against the chamber end, means associated with said cam plate and responsive to movement by said cam plate for rotating said breech block between locked and unlocked positions within the chamber by use of turning forces applied through said rotating means at diametrically opposed places on the breech block, means effective when said cam plate reaches its limit of travel in the block-unlocking direction for causing further movement of said handle in that direction to swing said hinge bar and breech block outwardly away from the chamber end, and means effective when and only when said hinge bar is separated from the chamber end for establishing between said handle and the hinge bar a coupling through which handle movement in the breech block locking direction is directly transmitted to the hinge bar whereby movement of said handle in that direction first closes said hinge bar against the chamber end and then rotates the breech block to its said locked position within the chamber.

7. In a gun, the combination of a chamber, a breech block movable into and out of the rearward portion of said chamber, a hinge bar rotatively supporting said breech block at its center and extending across the chamber end, a hinge support with rounded outer contour fixed to one side of the rear chamber wall, an operating handle pivoting one end of said hinge bar to said support, a cam plate carried by said hinge bar and disposed thereon so as to be movable by said handle lengthwise of said hinge bar when that bar is closed against the chamber end, means associated with said cam plate and responsive to movement by said cam plate for rotating said breech block between locked and unlocked positions within the chamber by use of turning forces applied through said rotating means at diametrically opposed places on the breech block, means effective when said cam plate reaches its limit of lengthwise travel in the breech block unlocking direction for directly coupling said handle to said hinge bar whereby further handle movement in the block-unlocking direction swings said hinge bar and breech block outwardly away from the chamber end, and means including an end portion of said cam plate which engagedly mates with the rounded outer contour of said hinge support upon separation of the hinge bar from the chamber end for then making said handle-to-hinge bar coupling effective in the opposite direction as long as the hinge bar stays open whereby movement of said handle in the breech block locking direction first closes said hinge bar against the chamber end and then rotates the breech block to its said locked position within the chamber.

References Cited in the file of this patent

UNITED STATES PATENTS

| | | |
|---|---|---|
| 447,228 | Canet | Feb. 24, 1891 |
| 537,701 | Mondragon | Apr. 16, 1895 |
| 542,379 | Silfersparre | July 9, 1895 |
| 628,870 | Tompkins | July 11, 1899 |
| 629,673 | Fletcher | July 25, 1899 |
| 1,340,215 | Dawson et al. | May 18, 1920 |